M. S. HART.
WIND SHIELD.
APPLICATION FILED FEB. 21, 1914.
1,136,229.
Patented Apr. 20, 1915.
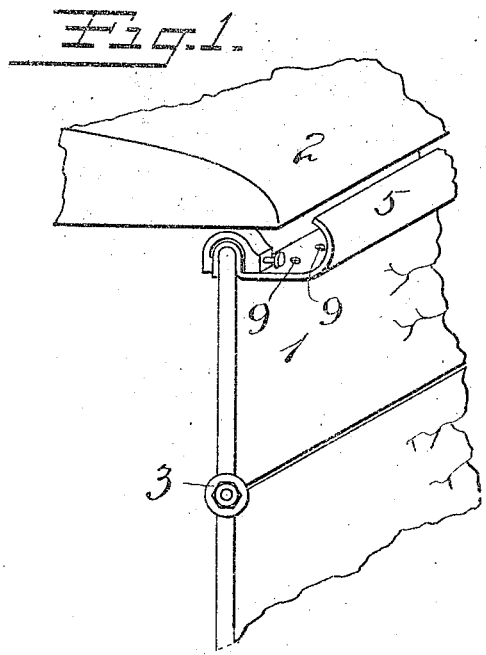
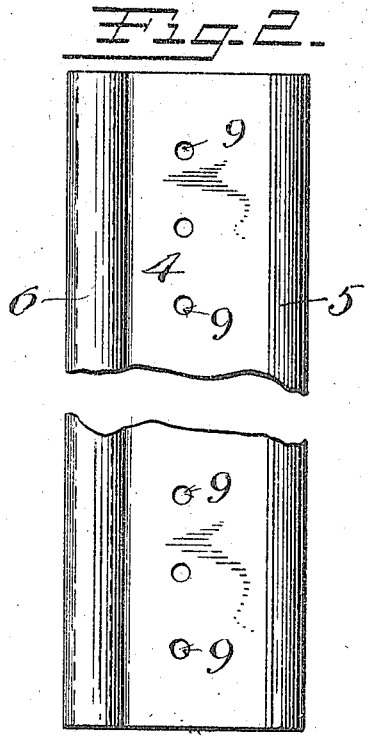
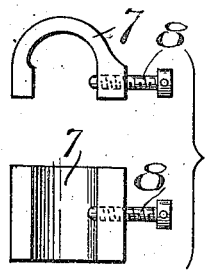
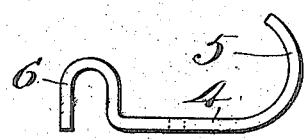
Witnesses:
Chas A. Peard
Ida M. Hunziker
Inventor
M. S. Hart
By his Attorneys

UNITED STATES PATENT OFFICE.

MAXWELL S. HART, OF NEW BRITAIN, CONNECTICUT.

WIND-SHIELD.

1,136,229.

Specification of Letters Patent.

Patented Apr. 20, 1915.

Application filed February 21, 1914. Serial No. 820,134.

*To all whom it may concern:*

Be it known that I, MAXWELL S. HART, a citizen of the United States, residing at New Britain, county of Hartford, State of Connecticut, have invented certain new and useful Improvements in Wind-Shields, of which the following is a full, clear, and exact description.

My invention relates to an improvement in so-called wind shield construction for vehicles such as automobiles.

The object of the invention is to provide a simple and effective appliance for preventing rain, snow and wind from driving through the space between the upper part of a wind shield and the overstanding forward edge of the folding top or canopy.

In the drawings Figure 1 is a perspective view of parts of a wind shield and top or canopy with my invention illustrated in its operative position relatively to said parts. Fig. 2 is a relatively enlarged plan view, partly broken away. Fig. 3 is an end elevation of the part shown in Fig. 2. Fig. 4 shows two views of a detail.

1 represents conventionally part of a transparent wind shield, which may be of any suitable construction. 2 represents conventionally part of a folding carriage top or canopy, which likewise may be of any suitable construction, the forward edge being shown as overstanding slightly the upper edge of the wind shield 1. The wind shield 1 is preferably of the well known adjustable type, one adjusting joint being shown at 3.

My improved protector device is arranged to be carried by the upper edge of the wind shield. This protector may be made from sheet metal and comprises the trough portion 4, having its front edge curled up and back, as shown at 5, while the rear edge is suitably constructed to fit onto the wind shield 1. In this particular instance the rear edge of said protector is provided with a corrugated portion 6, which provides a channel on its under side arranged to neatly fit over the upper edge of the wind shield, so as to be supported thereby, said wind shield and deflector being connected in any suitable manner, as for example by means of one or more clips 7, which may be provided with a suitable clamp screw 8. The bottom of the trough 4 may be provided with one or more small drain openings indicated conventionally at 9—9 the said drain openings being located in any position best adapted to drain off any water that may run into the trough.

In operation, when the parts assume the position indicated in Fig. 1, the rush of wind against the front of the deflector 5 will be deflected upwardly so as to stream over the top 2, part of the wind being also deflected downwardly against the shield 1. Directly to the rear of the curled-up portion 5, there is a "dead air" space. By this arrangement the draft of air that would otherwise rush through the space between the front end of the canopy 2 and the upper edge of the wind shield 1 will be prevented. So also in the event of rain or snow, the rain drops or snow flakes will not be carried through said space. Any water which may run down the incline of the top 2 and drip from the front edge thereof, will fall into the "dead air" space and be caught by the trough 4 directly back of the deflector 5. While obviously any water which may accumulate in the trough may be free to run out of each end of the said trough, in the event said ends are left open, as shown in the drawings, it is preferable to provide the small drain outlets 9—9, through which water may drip down in front of the wind shield, where it will become dissipated in the usual way.

It will be understood, of course, that I have shown my invention only in one preferred form, and that as to many structural details it may be modified in a variety of ways, my fundamental purpose and idea being to provide the protector means associated with a wind shield and so arranged relatively to the front edge of the top or canopy as to prevent wind, rain or snow from driving into the vehicle through the otherwise unprotected space.

It will be understood, of course, that the protector is preferably mounted upon the wind shield inasmuch as utilizing the wind shield for this purpose obviates the necessity of employing any other support for said protector.

What I claim is:

1. A protector for the space between a carriage top and a wind shield comprising a deflector arranged to be carried by the wind shield and to project above the same and arranged to stand in front of the front edge of said top, and arranged to deflect air upwardly over said top, said deflector including a trough located below the upper edge of said deflector and arranged to catch the drip from the front end of said top.

2. A protector for the space between a carriage top and a wind shield comprising, a deflector arranged to be carried by the wind shield and to project above the same and arranged to stand in front of the front edge of said top, and arranged to deflect air upwardly over said top, said deflector including a trough located below the upper edge of said deflector and arranged to catch the drip from the front end of said top, with means for detachably securing said protector to a wind shield.

3. A protector for the space between a carriage top and wind shield comprising, a deflector arranged to be carried by the wind shield and to project above the same and arranged to stand in front of the front edge of said top, and arranged to deflect air upwardly over said top, said deflector including a trough located below the upper edge of said deflector and arranged to catch the drip from the front end of said top, said trough having drain openings therein arranged in a position in front of said wind shield.

4. In a protector of the character described, a main body portion comprising a trough, an upwardly curled deflector flange along the front edge thereof, with means at the rear of said body portion for securing said protector to a suitable mounting.

5. In a protector of the character described, a main body portion comprising a trough, upwardly directed deflector flange along the front edge thereof, and means for supporting said protector.

MAXWELL S. HART.

Witnesses:
W. J. WILLIAMS,
GUY HUTCHINSON.